United States Patent
Lee et al.

(10) Patent No.: US 9,958,733 B2
(45) Date of Patent: May 1, 2018

(54) LIQUID CRYSTAL DISPLAY APPARATUS

(71) Applicant: LG Display Co., Ltd., Seoul (KR)

(72) Inventors: Yong Chul Lee, Gyeonggi-do (KR); Tae Joon Park, Gyeonggi-do (KR); Mun Gi Park, Gyeonggi-do (KR); Jong Ha Kim, Gyeonggi-do (KR); Hwa Jun Jung, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days. days.

(21) Appl. No.: 14/878,111

(22) Filed: Oct. 8, 2015

(65) Prior Publication Data
US 2016/0103345 A1    Apr. 14, 2016

(30) Foreign Application Priority Data
Oct. 10, 2014 (KR) .................. 10-2014-0136760

(51) Int. Cl.
*G02F 1/1339*  (2006.01)
*G02F 1/1335*  (2006.01)
*G02F 1/1333*  (2006.01)

(52) U.S. Cl.
CPC ...... *G02F 1/1339* (2013.01); *G02F 1/133345* (2013.01); *G02F 1/133351* (2013.01); *G02F 1/133512* (2013.01); *G02F 2201/56* (2013.01); *G02F 2202/28* (2013.01)

(58) Field of Classification Search
CPC ............. G02F 1/1339; G02F 1/133512; G02F 1/133345; G02F 1/133351
USPC .......................................... 349/153, 190, 110
See application file for complete search history.

(56) References Cited

U.S. PATENT DOCUMENTS

| | | | |
|---|---|---|---|
| 6,124,917 A * | 9/2000 | Fujioka | G02F 1/1339 349/138 |
| 2002/0047963 A1* | 4/2002 | Youn | G02F 1/133512 349/110 |
| 2004/0075801 A1* | 4/2004 | Choi | G02F 1/1339 349/153 |

(Continued)

FOREIGN PATENT DOCUMENTS

| | | |
|---|---|---|
| CN | 101533173 A | 9/2009 |
| CN | 101916007 A | 12/2010 |

(Continued)

OTHER PUBLICATIONS

The First Office Action dated Feb. 8, 2018, from the State Intellectual Property Office of People's Republic of China in counterpart Chinese application No. 201510648855.

*Primary Examiner* — Thanh-Nhan P Nguyen
(74) *Attorney, Agent, or Firm* — Morgan, Lewis & Bockius LLP (57) ABSTRACT

A liquid crystal display (LCD) apparatus is provided. The LCD apparatus includes a first substrate and a second substrate, each including a display area and a non-display area, a sealant disposed between the non-display area of the first substrate and the non-display area of the second substrate, and a first contact area and a light shielding pattern that are disposed in the non-display area of the first substrate. The light shielding pattern is disposed on one outermost side of the first substrate, the first contact area is disposed between the light shielding pattern and the display area, and the sealant contacts the first substrate in the first contact area.

18 Claims, 11 Drawing Sheets

(56) References Cited

U.S. PATENT DOCUMENTS

| | | | | |
|---|---|---|---|---|
| 2010/0002182 | A1* | 1/2010 | Lee | G02F 1/1341 349/154 |
| 2010/0085519 | A1* | 4/2010 | Liao | G02F 1/1339 349/110 |
| 2012/0026449 | A1* | 2/2012 | Yang | G02F 1/1339 349/153 |
| 2012/0099061 | A1* | 4/2012 | Lee | G02B 5/22 349/110 |

FOREIGN PATENT DOCUMENTS

| | | |
|---|---|---|
| JP | H06-273743 A | 9/1994 |
| JP | 2008-216894 A | 9/2008 |
| KR | 10-2008-0000786 A | 1/2008 |
| WO | 2012039342 A1 | 3/2012 |

\* cited by examiner

LIQUID CRYSTAL DISPLAY APPARATUS

CROSS-REFERENCE TO RELATED APPLICATIONS

This application claims the benefit of the Korean Patent Application No. 10-2014-0136760 filed on Oct. 10, 2014, which is hereby incorporated by reference as if fully set forth herein.

BACKGROUND

Field of the Invention

The present invention relates to a liquid crystal display (LCD) apparatus, and more particularly, to an LCD apparatus for reducing a bezel width.

Discussion of the Related Art

LCD apparatuses each include a lower substrate, an upper substrate, and a liquid crystal layer formed therebetween. In the LCD apparatuses, the alignment of liquid crystal of the liquid crystal layer is adjusted with an electric field applied thereto, and thus, a light transmittance is adjusted, thereby displaying an image.

Figure 1:
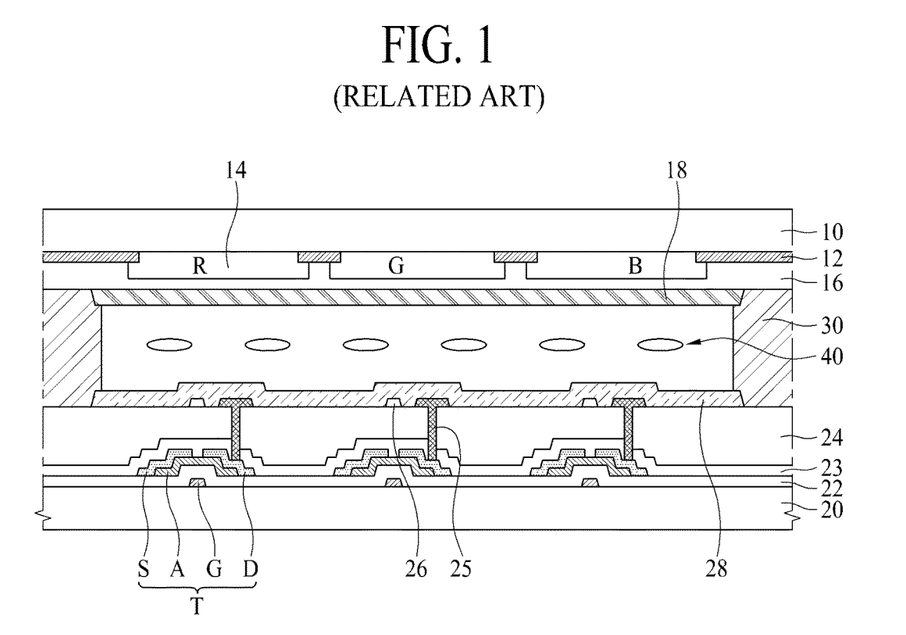
FIG. 1 is a schematic cross-sectional view of a related art LCD apparatus.

FIG. 1 is a schematic cross-sectional view of a related art LCD apparatus.

As seen in FIG. 1, the related art LCD apparatus includes an upper substrate 10, a lower substrate 20, a sealant 30, and a liquid crystal layer 40.

A light shielding pattern 12, a color filter 14, an overcoat layer 16, and an upper alignment layer 18 are formed on a bottom of the upper substrate 10.

The light shielding pattern 12 prevents light from being leaked to an area other than a pixel area. The light shielding pattern 12 is formed on the bottom of the upper substrate 10 in a matrix structure.

The color filter 14 is formed in a pixel area between adjacent light shielding patterns 12. The color filter 14 includes a red (R) color filter, a green (G) color filter, and a blue (B) color filter.

The overcoat layer 16 is formed on the light shielding pattern 12 and the color filter 14. The overcoat layer 16 is formed all over the bottom of the upper substrate 10 and enhances a surface uniformity of the bottom of the upper substrate 10.

The upper alignment layer 18 is formed on a bottom of the overcoat layer 16 and determines an initial alignment direction of the liquid crystal layer 40.

A thin film transistor (TFT) T is formed in each of a plurality of pixels on a top of the lower substrate 20, a pixel electrode 25 and a common electrode 26 are formed on the TFT T, and a lower alignment layer 28 is formed on the pixel electrode 25 and the common electrode 26. To provide a more detailed description, a gate electrode G, a gate insulation layer 22, an active layer A, a source electrode S, a drain electrode D, a passivation layer 23, a planarization layer 24, a pixel electrode 25/a common electrode 26, and the lower alignment layer 28 are sequentially formed on the lower substrate 20.

The TFT T is configured by a combination of the gate electrode G, the active layer A, the source electrode S, and the drain electrode D.

The gate insulation layer 22 is formed between the gate electrode G and the active layer A and insulates the gate electrode G from the active layer A.

The passivation layer 23 is formed on the source electrode S and the drain electrode D and protects the source electrode S and the drain electrode D.

The planarization layer 24 is formed on the passivation layer 23 and planarizes the top of the lower substrate 20.

The pixel electrode 25 is connected to the drain electrode D of the TFT T. The common electrode 26 is arranged in parallel with the pixel electrode 25 and generates an electric field along with the pixel electrode 25 to adjust an alignment direction of the liquid crystal of the liquid crystal layer 40.

The lower alignment layer 28 determines the initial alignment direction of the liquid crystal layer 40 along with the upper alignment layer 18.

The sealant 30 is formed between the upper substrate 10 and the lower substrate 20, bonds the upper substrate 10 to the lower substrate 20, and defines a space where the liquid crystal layer 40 is formed. The sealant 30 is formed at an outermost portion of the LCD apparatus.

The liquid crystal layer 40 is formed in a space between the upper substrate 10 and the lower substrate 20 defined by the sealant 30.

Recently, an effort to reduce a bezel width of an LCD apparatus is being continuously made for satisfying various requirements of consumers and improving an aesthetic appearance. A width of the sealant 30 formed at the outermost portion of the LCD apparatus should be reduced for decreasing a bezel width of the LCD apparatus. However, if a width of the sealant 30 is reduced, an adhesive force between the upper substrate 10 and the lower substrate 20 is weakened. To provide a detailed description on this, the sealant 30 is mainly adhered to the overcoat layer 16 formed on the upper substrate 10 and also is mainly adhered to the planarization layer 24 formed on the lower substrate 20. However, an adhesive force between the sealant 30 and the overcoat layer 16 is not excellent, and an adhesive force between the sealant 30 and the planarization layer 24 is not excellent. Therefore, it is required to increase a width of the sealant 30 to a certain extent or more so as to reinforce the adhesive forces which are not excellent, and for this reason, there is a limitation in reducing a bezel width of the LCD apparatus.

SUMMARY

Accordingly, the present invention is directed to provide an LCD apparatus that substantially obviates one or more problems due to limitations and disadvantages of the related art.

An object of the present invention is to provide an LCD apparatus in which a width of a sealant is reduced, and an adhesive force between an upper substrate and a lower substrate is enhanced by the sealant, thereby decreasing a bezel width.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display (LCD) apparatus comprises a first substrate and a second substrate, each including a display area and a non-display area; a sealant disposed between the non-display area of the first substrate and the non-display area of the second substrate; and a first contact area and a light shielding pattern that are disposed in the non-display area of the first substrate, wherein the light shielding pattern is disposed on one outermost side of the first substrate, the first contact area is disposed between the light shielding pattern and the display area, and the sealant contacts the first substrate in the first contact area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, exemplary embodiments of the present invention will be described in detail with reference to the accompanying drawings.

Figure 2:
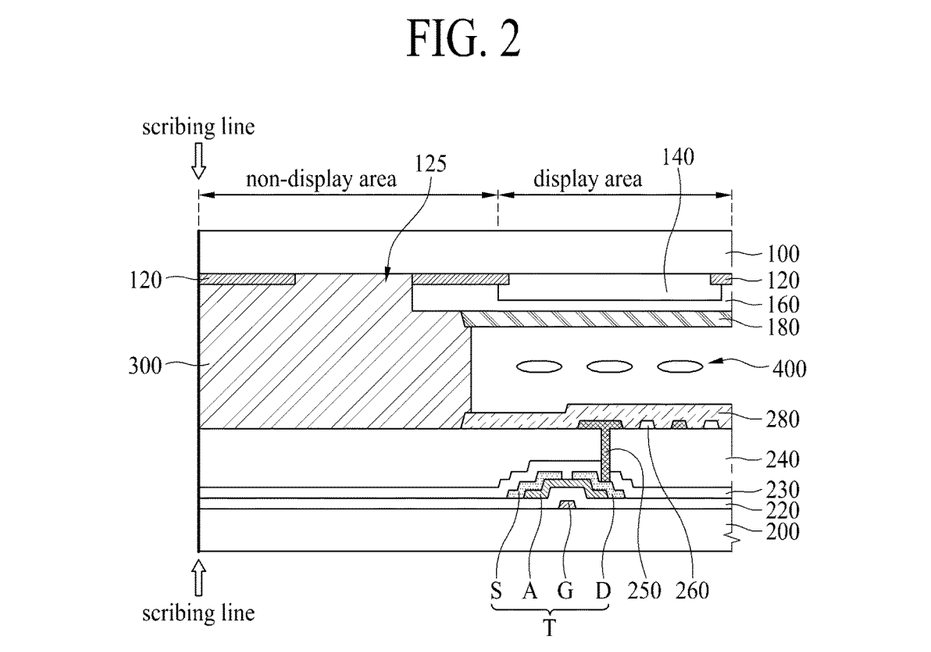
FIG. 2 is a schematic cross-sectional view of an LCD apparatus according to an embodiment of the present invention.

FIG. 2 is a schematic cross-sectional view of an LCD apparatus according to an embodiment of the present invention.

As seen in FIG. 2, the LCD apparatus according to an embodiment of the present invention may include a display area that displays an image and a non-display area that cannot display an image. The non-display area may be provided outside the display area. A scribing line may be disposed at an outermost side of the non-display area.

The LCD apparatus may include a first substrate 100, a second substrate 200, a sealant 300, and a liquid crystal layer 400.

The first substrate 100 may configure an upper substrate of the LCD apparatus. A light shielding pattern 120, a color filter 140, an overcoat layer 160, and a first alignment layer 180 may be formed on the first substrate 100, and in more detail, may be formed on a bottom of the first substrate 100 facing the second substrate 200.

The light shielding pattern 120 may be formed on the bottom of the first substrate 100. The light shielding pattern 120 prevents light from being leaked to an area other than a pixel area. The light shielding pattern 120 may be formed in a matrix structure in the display area. In the related art, the light shielding pattern 120 is formed all over the non-display area, but according to an embodiment of the present invention, the light shielding pattern 120 may not be formed all over the non-display area. In more detail, the light shielding pattern 120 may be formed in an area other than a first contact area 125 in the non-display area, and thus, the sealant 300 may directly contact the first substrate 100 through the first contact area 125, thereby enhancing an adhesive force between the sealant 300 and the first substrate 100. The first contact area 125 may be provided between the display area and the light shielding pattern 120 disposed at an outermost side of the first substrate 100. By removing a portion of the light shielding pattern 120, an opening area may be provided in the first contact area 125.

As described above, an adhesive force between the sealant 300 and the overcoat layer 160 is not excellent. On the other hand, an adhesive force between the sealant 300 and the first substrate 100 is better than an adhesive force between the sealant 300 and the overcoat layer 160. Therefore, according to an embodiment of the present invention, the sealant 300 may directly contact the first substrate 100, thereby enhancing an adhesive force between the sealant 300 and the first substrate 100. Accordingly, a width of the sealant 300 is reduced, and thus, a bezel width of the LCD apparatus is reduced.

Considering only an adhesive force between the sealant 300 and the first substrate 100, a contact area between the sealant 300 and the first substrate 100 may increase, and thus, the light shielding pattern 120 formed in an outermost region of the non-display area may be removed. Nevertheless, according to an embodiment of the present invention, the light shielding pattern 120 may be formed in the outermost region of the non-display area, and thus, the light shielding pattern 120 may be formed on the scribing line. This will be described in detail in a below-described manufacturing process.

The color filter 140 may be formed on the bottom of the first substrate 100. The color filter 140 may be formed in the display area, and particularly, may be formed in a pixel area between adjacent light shielding patterns 120. The color filter 140 may include a red color filter, a green color filter, and a blue color filter which are respectively formed in a plurality of pixels.

The overcoat layer 160 may be formed on the light shielding pattern 120 and the color filter 140. The overcoat layer 160 may be formed all over the bottom of the upper substrate 100 in the display area. The overcoat layer 160 may partially extend to the non-display area, but may not extend to inside the first contact area 125. The overcoat layer 160 may partially extend to inside the first contact area 125 due to a process error, but the overcoat layer 160 does not extend to cover the whole first contact area 125. This, as described above, is for enabling the sealant 300 to directly contact the first substrate 100.

The first alignment layer 180 may be formed on a bottom of the overcoat layer 160 and may adjust an initial alignment direction of the liquid crystal layer 400. Similarly to the overcoat layer 160, the first alignment layer 180 may be formed all over the bottom of the upper substrate 100 in the display area. Also, the first alignment layer 180 may partially extend to the non-display area, but may not extend to inside the first contact area 125. However, the first alignment layer 180 may partially extend to inside the first contact area 125 due to a process error, but the first alignment layer 180 does not extend to cover the whole first contact area 125.

The second substrate 200 may configure a lower substrate of the LCD apparatus. A thin film transistor (TFT) T, a pixel electrode 250, a common electrode 260, and a second alignment layer 280 may be formed on the second substrate 200, and in more detail, may be formed on a top of the second substrate 200 facing the first substrate 100.

In detail, a gate electrode G, a first inorganic insulation layer 220, an active layer A, a source electrode S, a drain electrode D, a second inorganic insulation layer 230, an organic insulation layer 240, a pixel electrode 250, a common electrode 260, and a second alignment layer 280 may be formed on the top of the second substrate 20.

The gate electrode G may be formed on the second substrate 200.

The first inorganic insulation layer 220 may be formed on the gate electrode G and may insulate the gate electrode G from the active layer A. The first inorganic insulation layer 220 may be formed of silicon nitride or silicon oxide, but is not limited thereto.

The active layer A may be formed on the first inorganic insulation layer 220, the source electrode S may be formed on one side of the active layer A, and the drain electrode D may be formed on the other side of the active layer A.

The second inorganic insulation layer 230 may be formed on the source electrode S and the drain electrode D and protects the source electrode S and the drain electrode D. The second inorganic insulation layer 230 may be formed of silicon nitride or silicon oxide, but is not limited thereto.

The organic insulation layer 240 may be formed on the second inorganic insulation layer 230. The organic insulation layer 240 may be formed to a relatively thick thickness and may planarize the top of the second substrate 200. The organic insulation layer 240 may be formed of an acryl-based organic material such as photo acryl, but is not limited thereto.

The TFT T may include the gate electrode G, the active layer A, the source electrode S, and the drain electrode D. In FIG. 2, a TFT having a bottom gate structure where the gate electrode G is disposed under the active layer A is illustrated, but the TFT T according to an embodiment of the present invention may include a top gate structure where the gate electrode G is disposed over the active layer A. In addition, a structure of the TFT T according to an embodiment of the present invention may be changed to various structures, known to those skilled in the art, such as a double gate structure and/or the like. Positions where the first inorganic insulation layer 220, the second inorganic insulation layer 230, and the organic insulation layer 240 are formed may be variously changed according to the structure of the TFT T being changed.

The pixel electrode 250 and the common electrode 260 may be formed on the organic insulation layer 240. The pixel electrode 250 may be connected to the drain electrode D of the TFT T through a contact hole which is formed in the organic insulation layer 240 and the second inorganic insulation layer 230. The common electrode 260 may be arranged in parallel with the pixel electrode 250, and thus, an alignment state of the liquid crystal of the liquid crystal layer 400 may be adjusted by a lateral electric field between the common electrode 260 and the pixel electrode 250.

In FIG. 2, the pixel electrode 250 and the common electrode 260 are illustrated as being formed on the same layer, but are not limited thereto. As another example, the pixel electrode 250 and the common electrode 260 may be formed on different layers. Particularly, the LCD apparatus according to an embodiment of the present invention may be applied various modes, known to those skilled in the art, such as a twisted nematic (TN) mode and a vertical alignment (VA) mode where the alignment state of the liquid crystal layer 400 is adjusted by a vertical electric field, in addition to an in-plane switching (IPS) mode and a fringe field switching (FFS) mode where the alignment state of the liquid crystal layer 400 is adjusted by a lateral electric field. Therefore, positions and shapes where the common electrode 260 and the pixel electrode 250 are formed may be variously changed. For example, in a case where the alignment state of the liquid crystal layer 400 is adjusted by the vertical electric field, the common electrode 260 may be formed at a position of the overcoat layer 160 on the first substrate 100, and the overcoat layer 160 may be omitted.

Although not shown, the LCD apparatus according to an embodiment of the present invention may be implemented in an in-cell touch type where a touch sensor is built into the LCD apparatus. In this case, the common electrode 250 may be formed to have a plurality of blocks on a layer different from a layer where the pixel electrode 250 is formed, and each of the plurality of blocks may act as a touch electrode for sensing a touch. Also, the plurality of blocks may be connected to each other by a separate sensing line.

The second alignment layer 280 may be formed on the pixel electrode 250 and the common electrode 260 and may determine the initial alignment direction of the liquid crystal layer 400. An alignment direction of the second alignment layer 280 may be vertical to that of the first alignment layer 180, but is not limited thereto. The second alignment layer 280 may be formed all over the top of the lower substrate 200 in the display area, but depending on the case, the second alignment layer 280 may partially extend to the non-display area.

The sealant 300 may be formed between the first substrate 100 and the second substrate 200 and may bond the first substrate 100 to the second substrate 200. The sealant 300 may be formed in the non-display area, and particularly, may be formed at an outermost side of the LCD apparatus. That is, the sealant 300 may be formed to overlap the scribing line.

The sealant 300 may contact the light shielding pattern 120 which is formed in the non-display area of the first substrate 100 and may also contact the first substrate 100 through the first contact area 125. Also, for process margin reason, the sealant 300 may contact the overcoat layer 160 and may also contact the first alignment layer 180.

The sealant 300 may contact the organic insulation layer 240 which is formed in the non-display area of the second substrate 200. Also, for process margin reason, the sealant 300 may contact the second alignment layer 280.

FIGS. 3A to 3D illustrate a manufacturing process of manufacturing an LCD apparatus according to an embodiment of the present invention. The reason why the light shielding pattern 120 is formed on the scribing line will be described in detail with reference to FIGS. 3A to 3D.

Figure 3A:
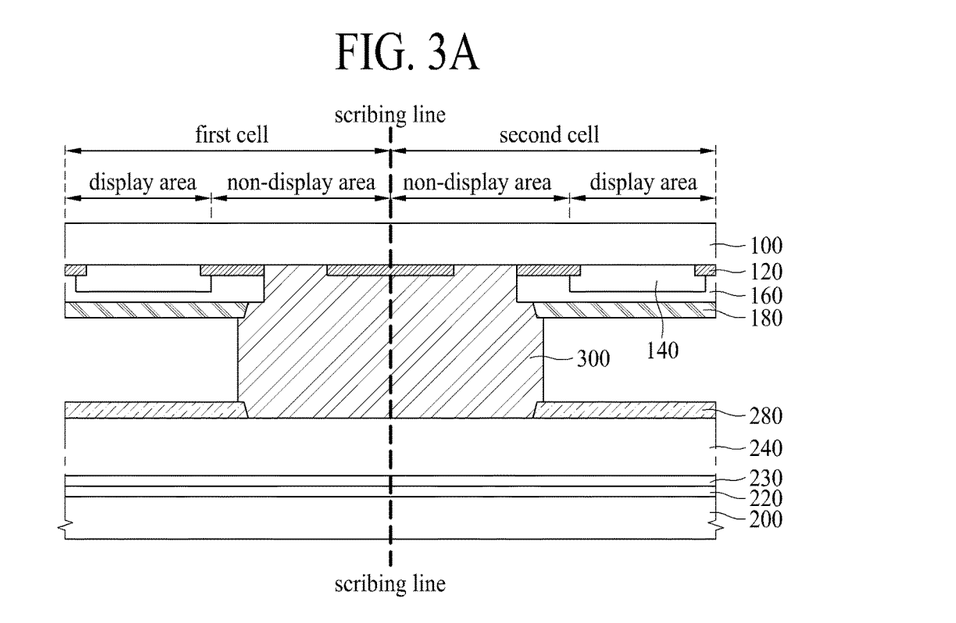
FIGS. 3A to 3D illustrate a manufacturing process of manufacturing an LCD apparatus according to an embodiment of the present invention.

In FIG. 3A, a bonded substrate which includes a left first cell and a right second cell and is in a state before a scribing process is performed is illustrated. The first cell and the second cell may undergo the scribing process and then configure the LCD apparatus described above with reference to FIG. 2. Thus, elements which are the same as the elements illustrated in FIG. 2 are referred to by like reference numerals. For convenience of a description, the TFT T is not illustrated in FIGS. 3A to 3D.

As seen in FIG. 3A, a scribing line may be provided between the first cell and the second cell, and a light shielding pattern 120 may be formed in a non-display area of each of the first and second cells with respect to the scribing line.

Figure 3B:
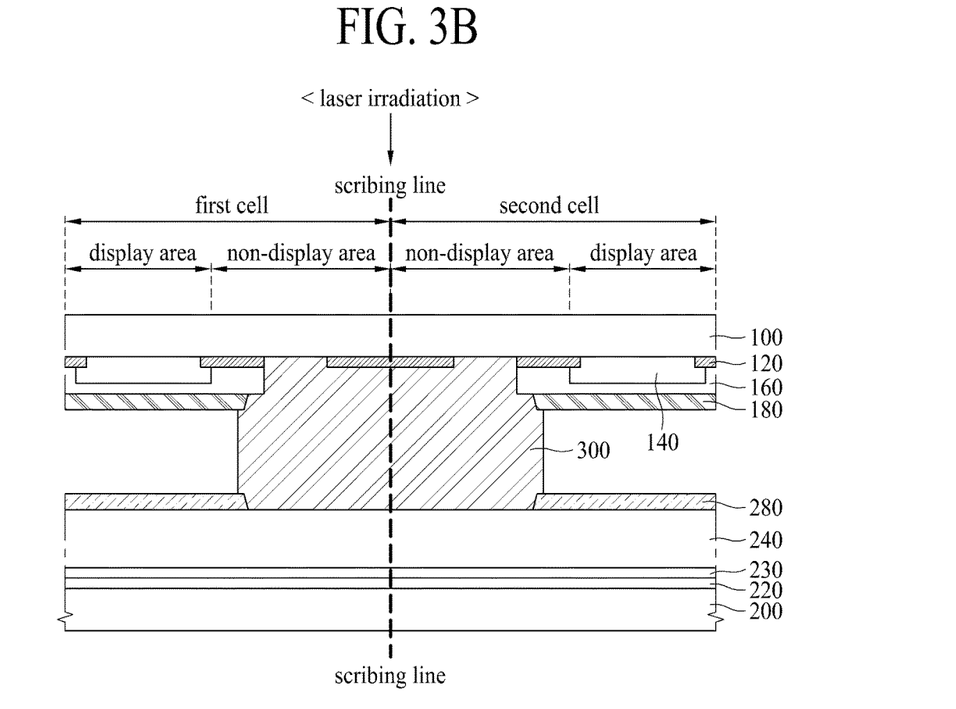

Subsequently, as seen in FIG. 3B, a laser irradiation process may be performed along the scribing line. The laser irradiation process may be performed for temporarily weakening an adhesive force of a sealant 300. For example, if the adhesive force of the sealant 300 is not weakened through the laser irradiation process, the first cell and the second cell is not smoothly isolated from each other after the below-described scribing process.

The laser irradiation process may comprise irradiating a laser having a certain wavelength onto the sealant 300 and thus temporarily weakening the adhesive force of the sealant 300 in an area (i.e., a scribing line area) onto which the laser is irradiated. Here, the light shielding pattern 120 overlapping the scribing line may convert the laser into thermal energy to enable the adhesive force of the sealant force 300 to be easily weakened. For example, if the light shielding pattern 120 is not formed, the irradiated laser passes through the sealant 300 as-is, and for this reason, a desired effect of weakening an adhesive force cannot be obtained. Also, if an intensity of the laser increases for obtaining a sufficient effect of weakening an adhesive force, the sealant 300 is burst.

Therefore, in an embodiment of the present invention, the light shielding pattern 120 may be formed to overlap the scribing line, and thus, when a laser is irradiated, light energy may be converted into thermal energy by the light shielding pattern 120, and thus, the sealant 300 area adjacent to the light shielding pattern 120 may be heated. For this reason, a gap occurs in a boundary surface between the light shielding pattern 120 and the sealant 300, and the adhesive force of the sealant 300 is weakened.

Figure 3C:
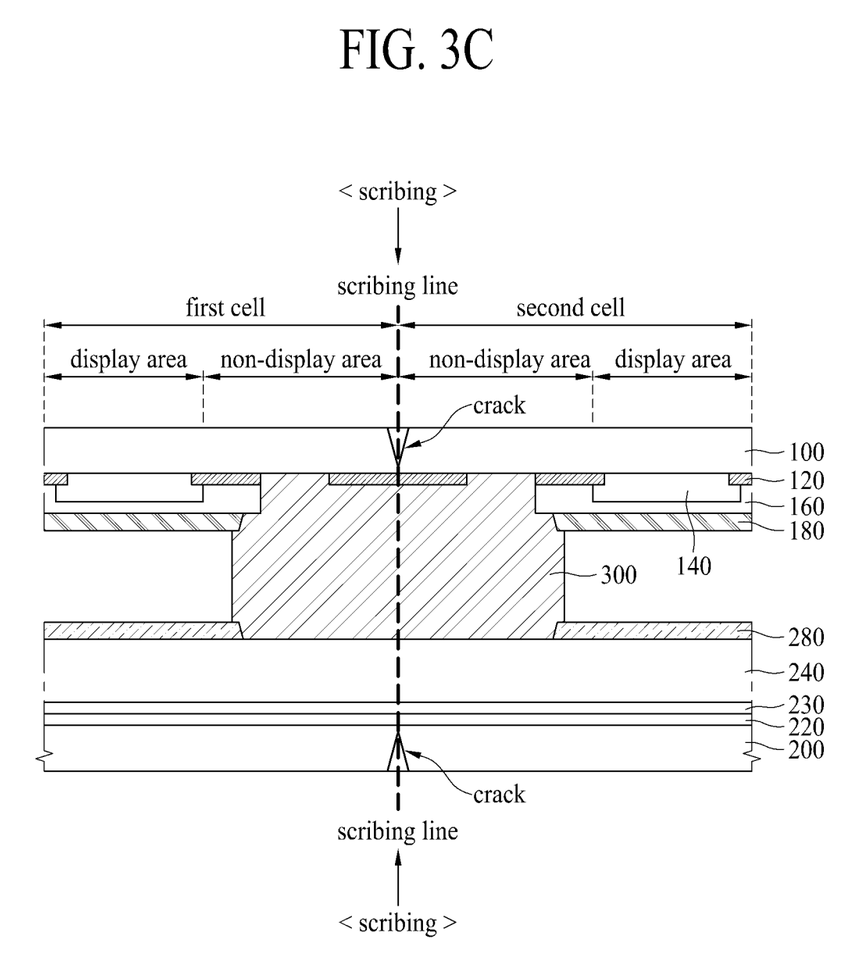

Subsequently, as seen in FIG. 3C, the scribing process may be performed along the scribing line. The scribing process may be performed for each of a top of a first substrate 100 and a bottom of a second substrate 200, and due to the scribing process, cracks occur in the first substrate 100 and the second substrate 200 along the scribing line. The scribing process may be performed by using a wheel, but is not limited thereto.

Figure 3D:
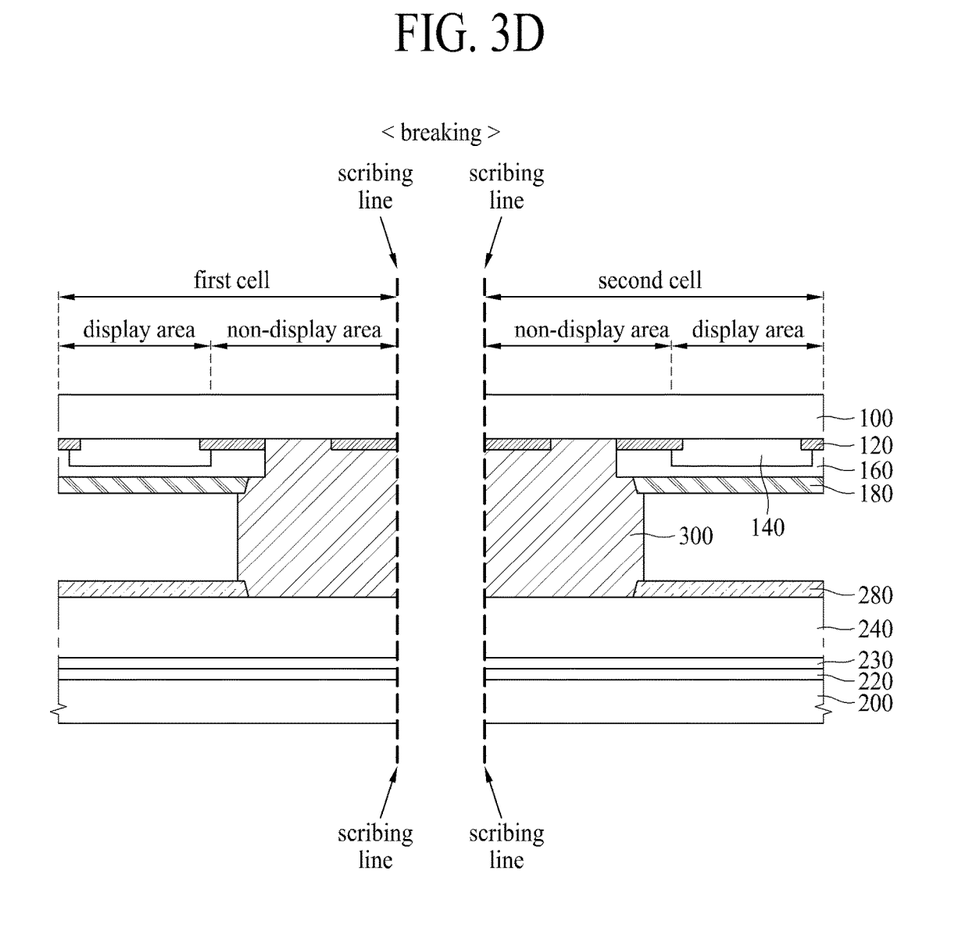

Subsequently, as seen in FIG. 3D, the first cell may be isolated from the second cell by performing a breaking process. The breaking process may comprise a process of applying a physical impact to the first substrate 100 or the second substrate 200.

As described above, the reason why the light shielding pattern 120 is formed on the scribing line is for easily weakening the adhesive force of the sealant 300 in the laser irradiation process.

Figure 4:
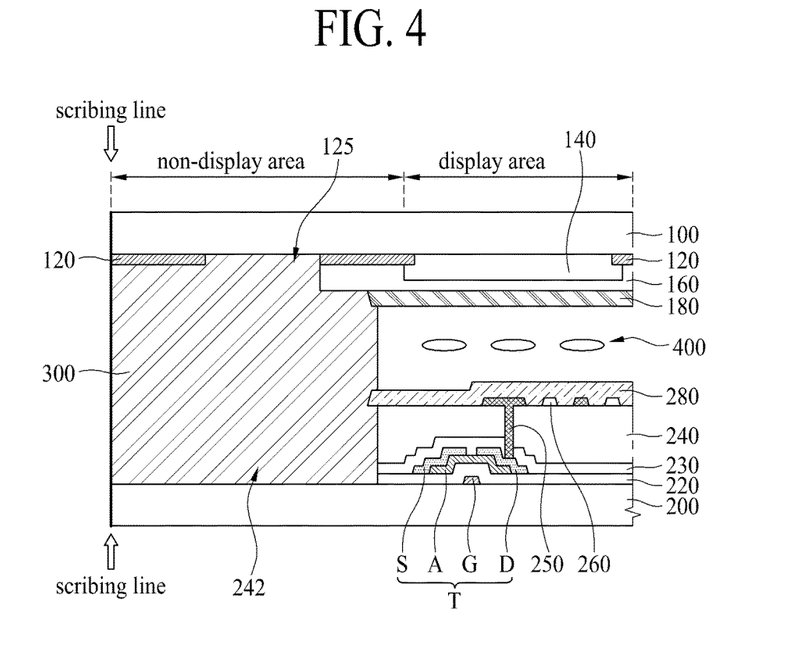
FIG. 4 is a schematic cross-sectional view of an LCD apparatus according to another embodiment of the present invention.

FIG. 4 is a schematic cross-sectional view of an LCD apparatus according to another embodiment of the present invention. Except that a structure of a non-display area of a second substrate 200 is changed, the LCD apparatus of FIG. 4 is the same as the above-described LCD apparatus of FIG. 2. Thus, like reference numerals refer to like elements. Hereinafter, only elements different from the elements of FIG. 2 will be described.

As seen in FIG. 4, a second contact area 242 where a first inorganic insulation layer 220, a second inorganic insulation layer 230, and an organic insulation layer 240 are not formed may be provided in the non-display area of the second substrate 200. Therefore, a top of the second substrate 200 may be exposed in the second contact area 242 in the non-display area of the second substrate 200, and thus, the sealant 300 may contact the second substrate 200.

An adhesive force between the second substrate 200 and the sealant 300 is better than an adhesive force between the organic insulation layer 240 and the sealant 300. Therefore, in another embodiment of the present invention, the sealant 300 may directly contact the top of the second substrate 200, and thus, the adhesive force between the second substrate 200 and the sealant 300 is strengthened.

Figure 5:
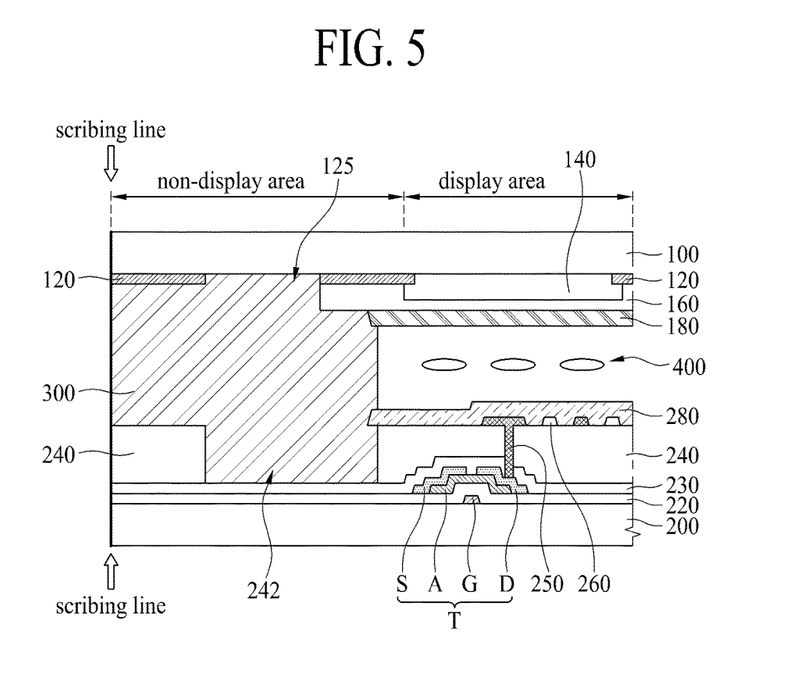
FIG. 5 is a schematic cross-sectional view of an LCD apparatus according to another embodiment of the present invention.

FIG. 5 is a schematic cross-sectional view of an LCD apparatus according to another embodiment of the present invention. Except that a structure of a non-display area of a second substrate 200 is changed, the LCD apparatus of FIG. 5 is the same as the above-described LCD apparatus of FIG. 2.

As seen in FIG. 5, a first inorganic insulation layer 220 and a second inorganic insulation layer 230 may be sequentially formed in the non-display area of the second substrate 200, and an organic insulation layer 240 may be formed on the second inorganic insulation layer 230. In this case, a second contact area 242 where the organic insulation layer 240 is not formed may be provided in the non-display area of the second substrate 200, and a portion of a sealant 300 may be formed in the second contact area 242. The second contact area 242 may be provided between a display area and the organic insulation layer 240 which is disposed at an outermost side of the second substrate 100. By removing a portion of the organic insulation layer 240, an opening area may be provided in the second contact area 242. Therefore, the sealant 300 may directly contact the second inorganic insulation layer 230 through the second contact area 242, and thus, an adhesive force between the sealant 300 and the second substrate 200 is enhanced.

An adhesive force between the second inorganic insulation layer 230 and the sealant 300 is better than the adhesive force between the organic insulation layer 240 and the sealant 300. That is, an inorganic insulation layer is better in adhesive force to a sealant than an organic insulation layer. Therefore, in another embodiment of the present invention, the adhesive force between the sealant 300 and the second substrate 200 is strengthened by bringing the sealant 300 in direct contact with a top of the second inorganic insulation layer 230. Although not shown, the second inorganic insulation layer 230 may not be formed in the non-display area of the second substrate 200, and thus, the sealant 300 may directly contact the first inorganic insulation layer 220 through the second contact area 242. As a result, in a structure illustrated in FIG. 5, the sealant 300 may contact the organic insulation layer 240 and may also contact the first inorganic insulation layer 220 or the second inorganic insulation layer 230.

Since the organic insulation layer 240 contacting the sealant 300 is formed in an outermost region of the non-display area, the organic insulation layer 240 may be formed on the scribing line. In this case, the organic insulation layer 240 may be formed to overlap a light shielding pattern 120. When both the light shielding pattern 120 and the organic insulation layer 240 are formed on the scribing line, a laser passing through the light shielding pattern 120 may be reflected by the organic insulation layer 240 in the above-described laser irradiation process of FIG. 3B, and thus, a process of weakening an adhesive force of the sealant 300 is more smoothly performed, thereby weakening an intensity of the laser.

Such an effect of reflecting the laser is more easily obtained in a case, where the organic insulation layer 240 is formed on the scribing line as in FIG. 5, than a case where the second substrate 200 is exposed to the scribing line as in FIG. 4. Also, although not shown, in FIG. 5, by removing the organic insulation layer 240 near the scribing line, the second inorganic insulation layer 230 or the first inorganic insulation layer 220 may be exposed on the scribing line.

FIGS. 6A to 6D are schematic cross-sectional views of an LCD apparatus according to various embodiments of the present invention and illustrates only an area where a sealant 300 is formed in a non-display area.

As seen in FIGS. 6A to 6D, elements formed on a bottom of a first substrate 100 are the same as the above-described elements of FIG. 2, and thus, only elements formed on a top of a second substrate 200 will be described below.

Figure 6A:
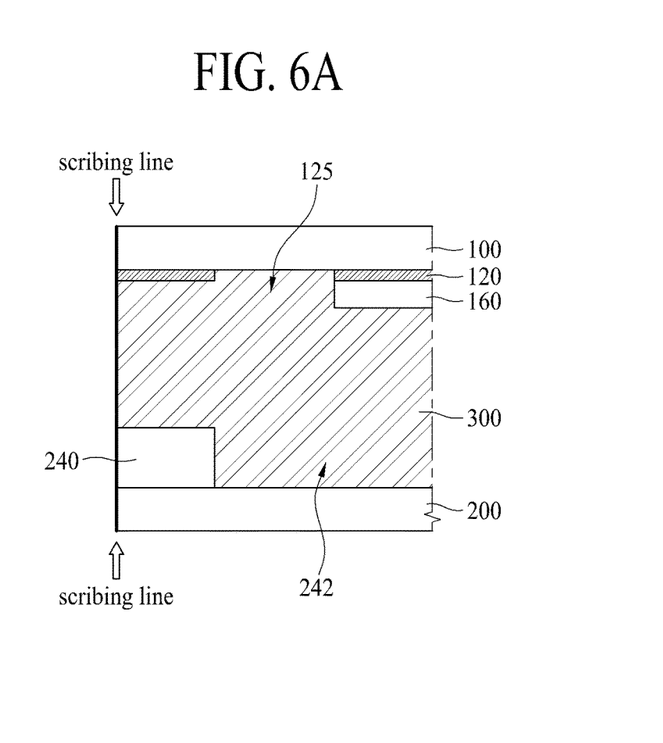
FIGS. 6A to 6D are schematic cross-sectional views of an LCD apparatus according to various embodiments of the present invention.

As seen in FIG. 6A, an organic insulation layer 240 may be formed on the top of the second substrate 200. A second contact area 242 where the organic insulation layer 240 is not formed may be provided in a non-display area of the second substrate 200. Also, the organic insulation layer 240 may be formed in an outermost region of the non-display area, and thus, the organic insulation layer 240 may be formed on a scribing line.

Therefore, a sealant 300 may directly contact the first substrate 100 and the second substrate 200, and thus, an adhesive force between the first substrate 100 and the second substrate 200 is good. Also, both a light shielding pattern 120 and the organic insulation layer 240 may be formed on the scribing line, and thus, a scribing process is smoothly performed.

Figure 6B:
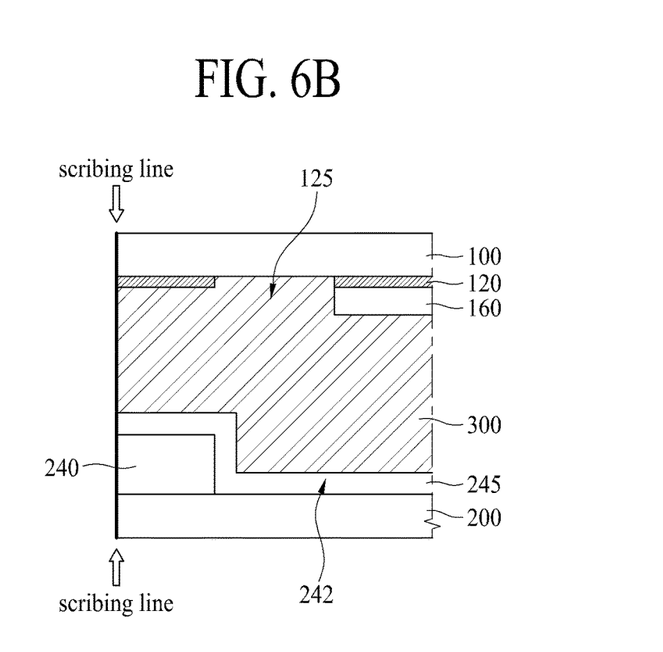
Figure 6C:
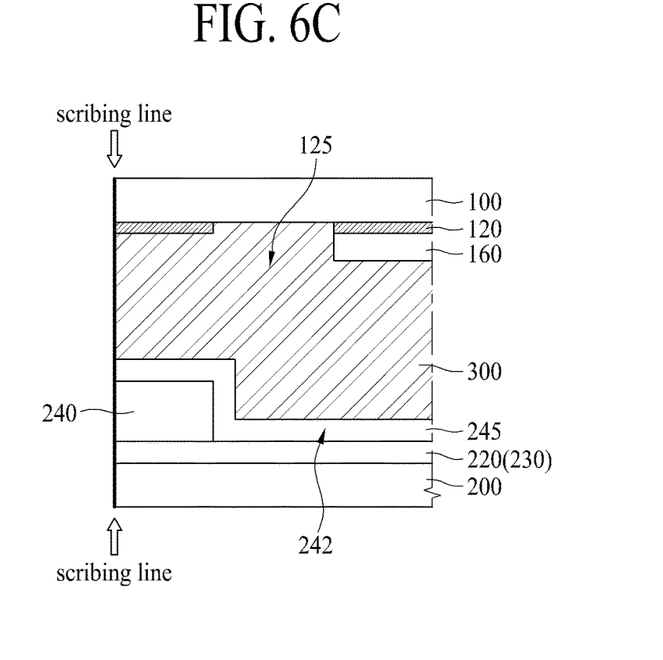

In FIG. 6B, a third inorganic insulation layer 245 formed on the top of the organic insulation layer 240 and the second substrate 200 may be added to the structure of FIG. 6A and may be formed in the second contact area 242. In FIG. 6C, a first inorganic insulation layer 220 or a second inorganic insulation layer 230 formed under the organic insulation layer 240 and the third inorganic insulation layer 245 may be added to the structure of FIG. 6B. In the structure of FIG. 6B and the structure of FIG. 6C, the sealant 300 may directly contact the first substrate 100 and the third inorganic insulation layer 245, and thus, the adhesive force between the first substrate 100 and the second substrate 200 is good. Also, both the light shielding pattern 120 and the organic insulation layer 240 may be formed on the scribing line, and thus, the scribing process is smoothly performed.

Figure 6D:
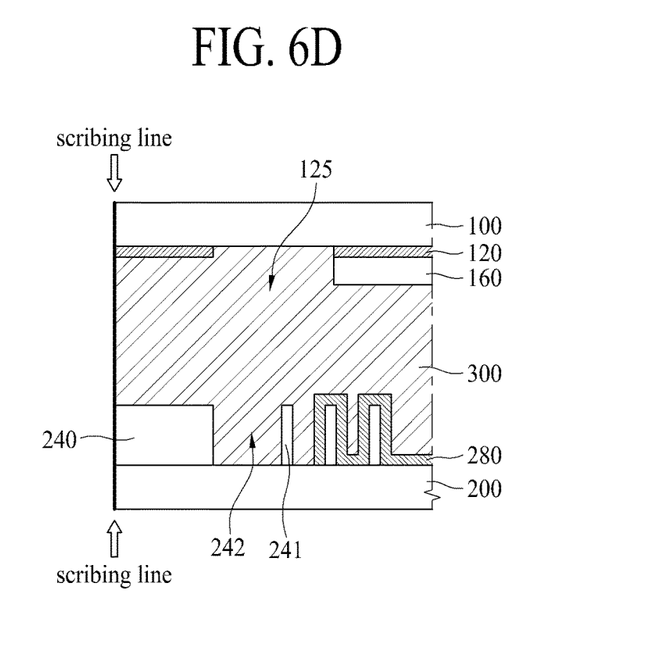

In FIG. 6D, a prevention wall 241 formed in the second contact area 242 may be added to the structure of FIG. 6A. The prevention wall 241 prevents a second alignment layer 280 from covering the whole second contact area 242 when a second alignment layer 280 penetrates into the second contact area 242. As described above, the second alignment layer 280 may extend to the non-display area, and depending on the case, the second alignment layer 280 may extend to the second contact area 242. In this case, since the second alignment layer 280 is not good in adhesive force to the sealant 300, if the second alignment layer 280 covers the whole second contact area 242, the sealant 300 cannot directly contact the second substrate 200, whereby an adhesive force between the sealant 300 and the second substrate 200 is weakened. Therefore, in the structure of FIG. 6D, the prevention wall 241 may be formed to prevent the second alignment layer 280 from covering the whole second contact area 242 even when the second alignment layer 280 extends to the second contact area 242. The prevention wall 241 may be formed of the same material as that of the organic insulation layer 240. The prevention wall 241 may be provided in plurality as illustrated, but may be provided as one. The prevention wall 241 may be applied to the above-described structures of FIGS. 4, 5, 6B and 6C.

Figure 7:
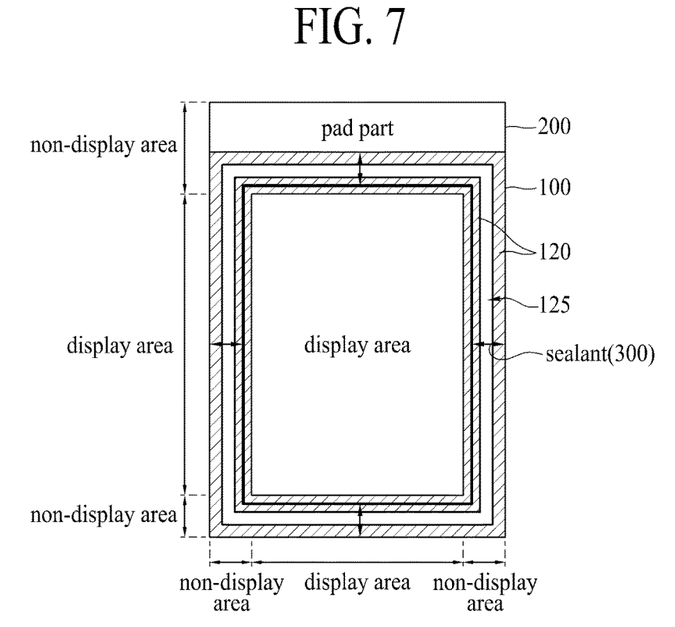
FIG. 7 is a schematic plan view of an LCD apparatus according to an embodiment of the present invention.

FIG. 7 is a schematic plan view of an LCD apparatus according to an embodiment of the present invention. As seen in FIG. 7, a display area may be provided at a center portion of the LCD apparatus, and a non-display area may be provided outside the display area. A pad part for transferring an external signal may be provided in the non-display area. The pad part is illustrated in the drawing as being provided on an upper side of the LCD apparatus, but a position of the pad part may be variously changed. For example, the pad part may be further provided on a lower side of the LCD apparatus as well as the upper side. Since the pad part should be exposed to the outside, a substrate including the pad part may be larger by a size of the pad part than a substrate including no pad part. Generally, since the pad part is mainly provided on a second substrate 200 including a TFT, a size of the second substrate 200 may be larger than that of a first substrate 100 as illustrated.

A light shielding pattern 120 and a first contact area 125 may be provided in the non-display area outside the display area, and thus, the first substrate 100 may directly contact the sealant 300 through the first contact area 125. The sealant 300 may be formed in the non-display area, and particularly, may be formed on an outermost side of each of the first substrate 100 and the second substrate 200. The sealant 300 may be formed on the outermost side, where the first substrate 100 overlaps the second substrate 200, in an upper portion of the LCD apparatus where the pad part is disposed. For convenience, a portion where the sealant 300 is formed is illustrated as an arrow. This is applied to embodiments to be described below.

The first contact area 125, as illustrated, may be formed to surround an outer portion of the display area in a shape corresponding to the display area. When the display area is provided in a tetragonal shape as illustrated, the first contact area 125 may also be provided in a shape of a tetragonal frame along a boundary line between the display area and the non-display area.

Figure 8:
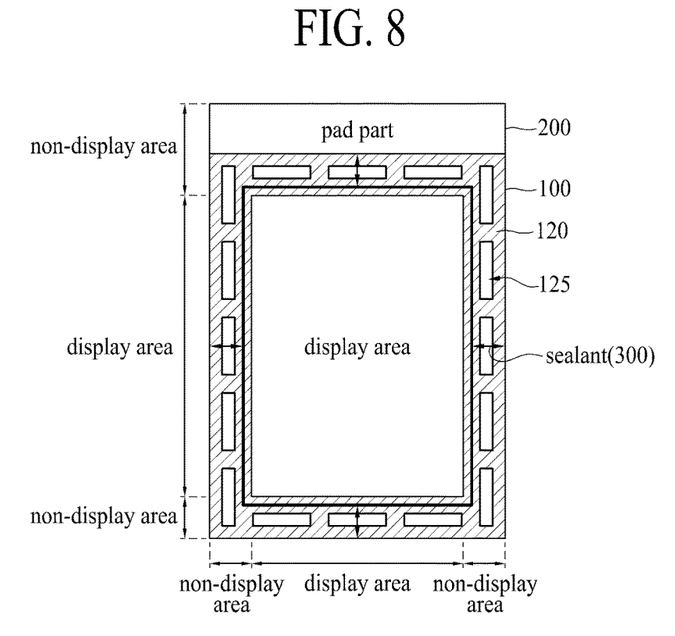
FIG. 8 is a schematic plan view of an LCD apparatus according to another embodiment of the present invention.

FIG. 8 is a schematic plan view of an LCD apparatus according to another embodiment of the present invention. As seen in FIG. 8, the first contact area 125 may be provided in a straight-line shape which wholly surrounds an outer portion of a display area. In FIG. 7, the first contact area 125 is provided in a straight-line shape that is continued along an outer line of the display area, but in FIG. 8, a first contact area 125 may be provided at only a portion of an outer line of the display area. That is, the first contact area 125 may be configured by a combination of a plurality of straight lines which are discontinued along the outer line of the display area. Although not shown, the first contact area 125 may be configured by a combination of a plurality of straight lines or dot lines which are irregularly arranged. Also, the second contact area 242 may be provided in a straight-line shape that surrounds an outer portion of the display area on a second substrate 200, or may be configured by a combination a plurality of discontinuous straight lines.

Figure 9:
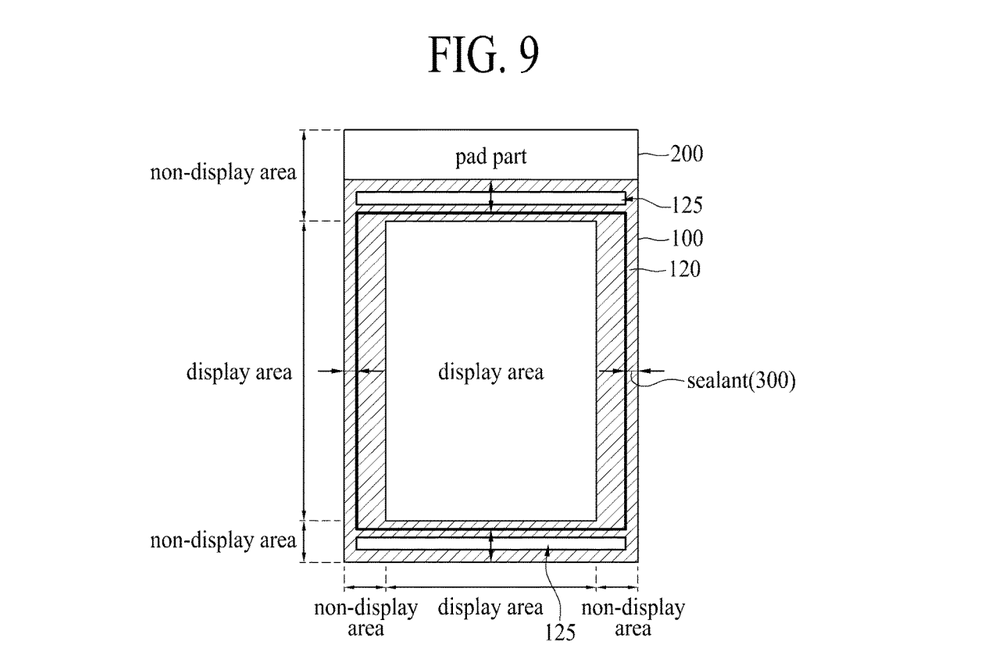
FIG. 9 is a schematic plan view of an LCD apparatus according to another embodiment of the present invention.

FIG. 9 is a schematic plan view of an LCD apparatus according to another embodiment of the present invention. In FIG. 9, a first contact area 125 may be provided on each of an upper side and a lower side of the LCD apparatus. Although not shown, the first contact area 125 may be provided on only one of the upper side and the lower side of the LCD apparatus. Also, a second contact area 242 may be provided on each of the upper side and the lower side of the LCD apparatus, or may be provided on only one of the upper side and the lower side of the LCD apparatus.

Figure 10:
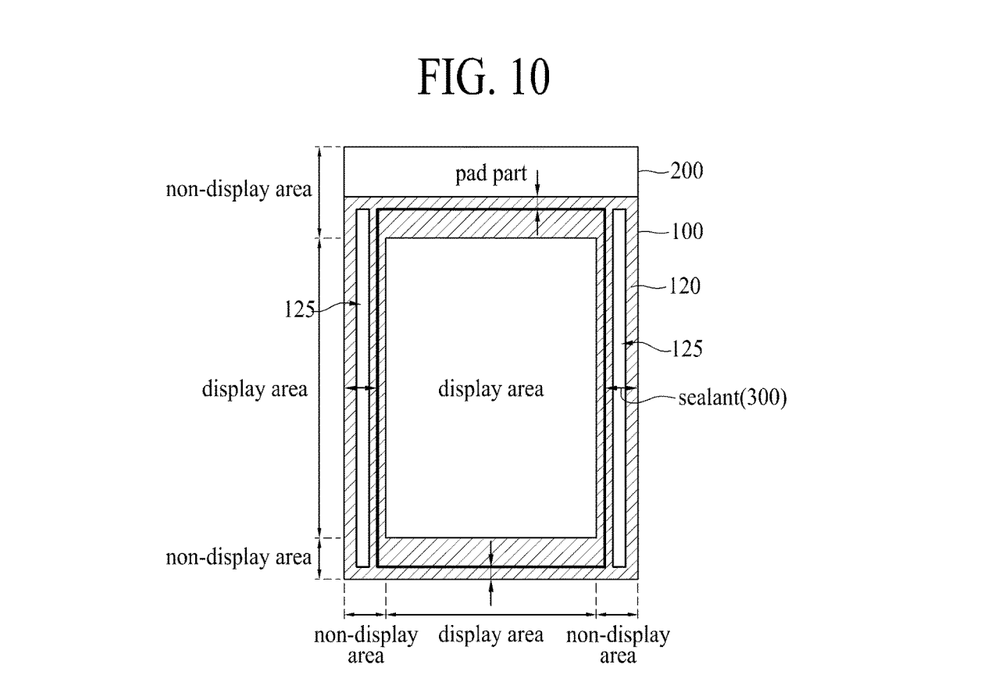
FIG. 10 is a schematic plan view of an LCD apparatus according to another embodiment of the present invention.

FIG. 10 is a schematic plan view of an LCD apparatus according to another embodiment of the present invention. In FIG. 10, a first contact area 125 may be provided on each of a left side and a right side of the LCD apparatus. Although not shown, the first contact area 125 may be provided on only one of the left side and the right side of the LCD apparatus. Also, a second contact area 242 may be provided on each of the left side and the right side of the LCD apparatus, or may be provided on only one of the left side and the right side of the LCD apparatus.

Figure 11A:
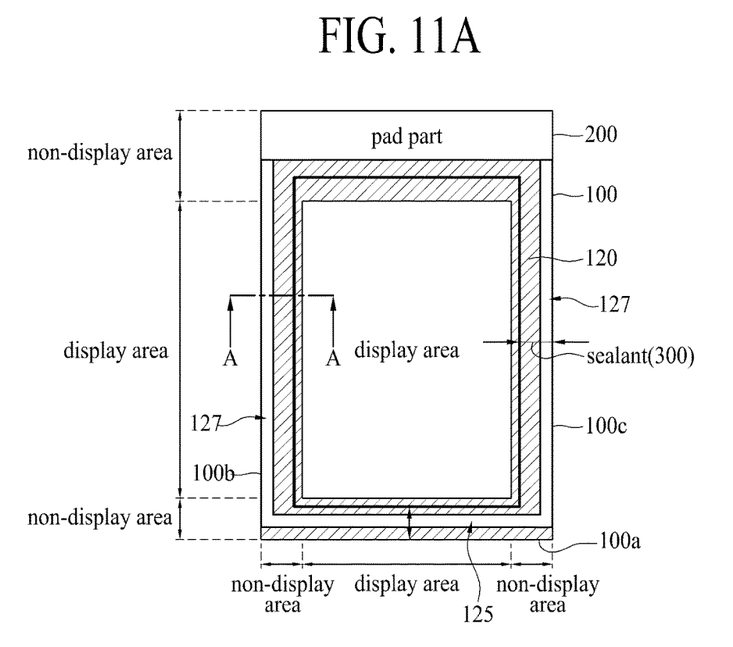
FIG. 11A is a schematic plan view of an LCD apparatus according to another embodiment of the present invention.
Figure 11B:
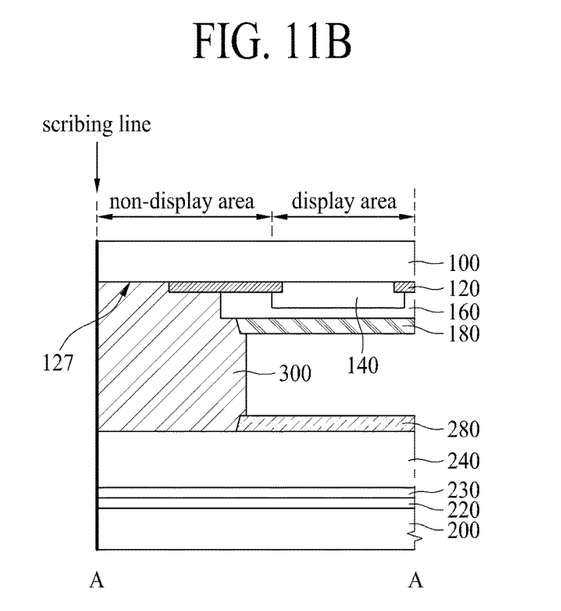
FIG. 11B is a schematic cross-sectional view of an LCD apparatus according to another embodiment of the present invention.

FIG. 11A is a schematic plan view of an LCD apparatus according to another embodiment of the present invention, and FIG. 11B is a schematic cross-sectional view of an LCD apparatus according to another embodiment of the present invention. FIG. 11B illustrates a cross-sectional surface according to an embodiment taken along line A-A of FIG. 11A.

As seen in FIGS. 11A and 11B, a first contact area 125 and a third contact area 127 may be provided in a non-display area of the first substrate 100. The first contact area 125 may be provided on a lower side of the LCD apparatus, and the third contact area 127 may be provided on each of a left side and a right side of the LCD apparatus.

The first contact area 125 provided on the lower side of the LCD apparatus may not be provided on a lower outermost side 100a of the LCD apparatus but may be provided at a position which is separated from the lower outermost side 100a of the LCD apparatus by a certain distance. Therefore, a light shielding pattern 120 may be formed on the lower outermost side 100a of the LCD apparatus, and thus, the scribing process is more smoothly performed.

The third contact area 127 provided on each of the left side and the right side of the LCD apparatus may be provided on each of a left outermost side 100b and a right outermost side 100c of the LCD apparatus. Therefore, the light shielding pattern 120 may not be provided on the left outermost side 100b and the right outermost side 100c of the LCD apparatus but may be provided at each of positions which are separated from the left outermost side 100b and the right outermost side 100c of the LCD apparatus by a certain distance.

Although not shown, the third contact area 127 which is formed on an outermost side of the LCD apparatus, namely, a scribing line, may be provided on only one of a left side and a right side of the LCD apparatus, and depending on the cases, the third contact area 127 may be provided on an upper side or a lower side of the LCD apparatus.

In FIGS. 7 to 11B, the light shielding pattern 120, the first contact area 125, and the third contact area 127 of the first substrate 100 are illustrated. Although not shown in detail, the organic/inorganic insulation layer and the second contact area 242 of the second substrate 200 may be similarly changed.

Figure 12:
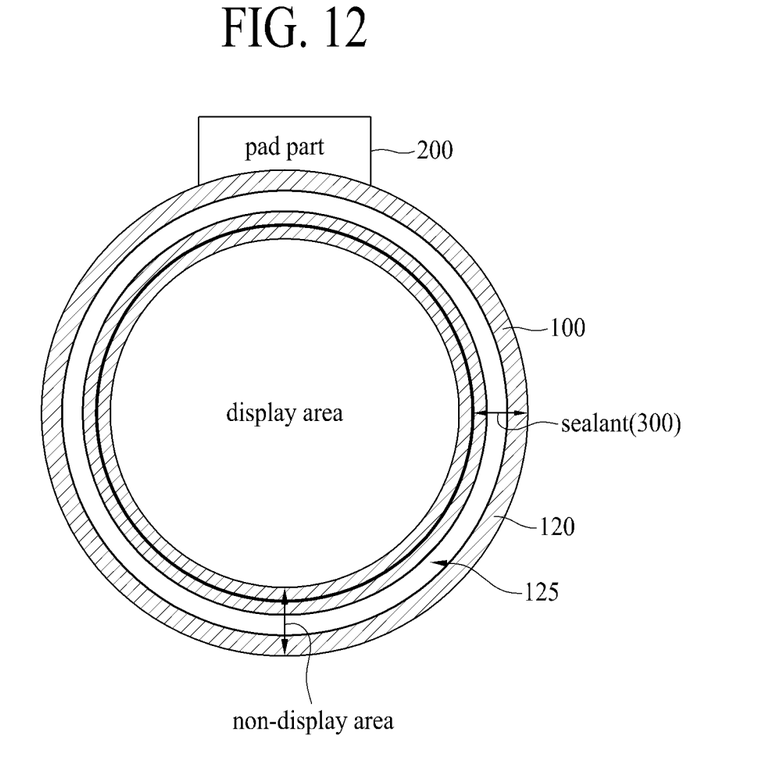
FIG. 12 is a plan view of an LCD apparatus according to another embodiment of the present invention.

FIG. 12 is a plan view of an LCD apparatus according to another embodiment of the present invention and relates to an LCD apparatus where a display area is provided in a curve shape.

According to FIG. 12, since the display area is provided in a curve shape, a first contact area 125 provided in a non-display area may also be provided in a curve shape outside the display area. The first contact area 125 having a curve shape illustrated in FIG. 12 may be variously changed similarly to the above-described various embodiments.

As described above, according to the embodiments of the present invention, since the sealant is directly adhered to the first substrate, an adhesive force between the sealant and the first substrate is enhanced, and thus, a width of the sealant is reduced, thereby decreasing a bezel width of the LCD apparatus.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) apparatus comprising:
a first substrate and a second substrate, each including a display area and a non-display area;
a sealant disposed between the non-display area of the first substrate and the non-display area of the second substrate;
a first contact area and a light shielding pattern that are disposed in the non-display area of the first substrate, and
an organic insulation layer in the non-display area of the second substrate; and
a second contact area and an inorganic insulation layer in the non-display area of the second substrate,
wherein a portion of the sealant is in the second contact area,
wherein
the light shielding pattern and the organic insulation layer are respectively on one outermost side of the first substrate and the second substrate to overlap with each other, being configured to facilitate a scribing process,
the first contact area is disposed between the light shielding pattern and the display area, and
the sealant is adjacent to the light shielding pattern on the first substrate and the organic insulation layer on the second substrate,
wherein the sealant is in a line with the light shielding pattern and the organic insulation layer in the one outermost side of the first substrate and the second substrate, and
wherein the organic insulation layer is not formed at the second contact area, and the portion of the sealant in the second contact area contacts the inorganic insulation layer.

2. The LCD apparatus of claim 1, wherein:
the inorganic insulation layer is a second insulation layer, and the LCD apparatus further comprises
a first insulation layer in the non-display area of the second substrate.

3. The LCD apparatus of claim 2, wherein the sealant provides improved contact to the second substrate through the second contact area.

4. The LCD apparatus of claim 1,
wherein the sealant directly contacts the inorganic insulation layer in the second contact area.

5. The LCD apparatus of claim 2, wherein the first insulation layer is on an outermost side of the second substrate to overlap the light shielding pattern.

6. The LCD apparatus of claim 2, further comprising at least one prevention wall in the second contact area.

7. The LCD apparatus of claim 1, wherein the first contact area is provided in a shape corresponding to the display area along an outer boundary of the display area.

8. The LCD apparatus of claim 1, wherein the first contact area is provided in a continuous or discontinuous straight-line shape along an outer boundary of the display area.

9. The LCD apparatus of claim 1, wherein the first contact area is provided in a continuous or discontinuous curve shape along an outer boundary of the display area.

10. The LCD apparatus of claim 1, further comprising a third contact area in the non-display area of the first substrate,
wherein
the third contact area is on the other one outermost side of the first substrate, and
the sealant contacts the first substrate in the third contact area.

11. A liquid crystal display (LCD) apparatus comprising:
an upper substrate having an inner surface at which a light shielding layer, a color filter structure, and an overcoat layer are provided;
a lower substrate having an inner surface at which a thin-film transistor (TFT) array, a pixel electrode, a common electrode, and a planarization layer are provided, wherein the planarization layer includes organic insulation material; and
a sealing region along a periphery of the upper and lower substrates having their inner surfaces facing each other and adhesively attached together by a sealant in the sealing region,
the sealing region having an open area configured to allow adhesive attachment between the sealant and the upper and lower substrates, and having a scribing area, which is adjacent to the open area along an edge of the periphery, configured to facilitate an LCD cell separation process using laser scribing, wherein the planarization layer is located in the scribing area but not in the open area, and
the sealing region allowing the sealant to have minimal overall width to achieve a narrower bezel area when compared to an LCD apparatus without the sealing region,
wherein the sealant is in a line with the light shielding pattern and the planarization layer in an outermost side of the upper substrate and the lower substrate, and
wherein the sealant at the open area contacts an inorganic insulation layer.

12. The apparatus of claim 11, wherein the scribing area includes an upper structure at the inner surface of the upper substrate and includes a lower structure at the inner surface of the lower substrate opposing the upper structure, wherein the upper and lower structures are configured to allow laser energy from laser scribing to be converted into thermal energy that weakens an adhesiveness of the sealant around the scribing area.

13. The apparatus of claim 12, wherein the lower structure is patterned from the planarization layer.

14. The apparatus of claim 13, wherein the upper structure is patterned from the light shielding layer.

15. The apparatus of claim 14, wherein the sealant in the open area is in direct contact with at least one among the upper and lower substrates.

16. The apparatus of claim 14, wherein the open area is configured as a continuous linear pattern surrounding a display area of the upper and lower substrates.

17. The apparatus of claim 14, wherein the open area is configured as a discontinuous linear pattern surrounding a display area of the upper and lower substrates.

18. The apparatus of claim 11, wherein the sealant at the open area directly contacts the inorganic insulation layer.